United States Patent
Yamaguchi et al.

[11] Patent Number: 6,121,700
[45] Date of Patent: *Sep. 19, 2000

[54] BRUSHLESS MOTOR AND METHOD OF MANUFACTURE

[75] Inventors: Mineo Yamaguchi, Obu; Akihiko Suzuki; Masaaki Shimizu, both of Toyohashi, all of Japan

[73] Assignee: Asmo Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 09/274,988

[22] Filed: Mar. 23, 1999

[30] Foreign Application Priority Data

Mar. 26, 1998 [JP] Japan .................. 10-079199
Jan. 18, 1999 [JP] Japan .................. 11-009737

[51] Int. Cl.[7] .......................... H02K 11/00; H02K 15/00
[52] U.S. Cl. ................................. 310/68 B; 310/42
[58] Field of Search .......................... 310/68 B, 66, 310/67 R, 68 C, 68 D, 68 E, 89, 42, 91, 90; 318/830; 29/596, 598

[56] References Cited

U.S. PATENT DOCUMENTS

| | | | |
|---|---|---|---|
| 4,259,603 | 3/1981 | Uchiyama et al. | 310/68 B |
| 4,857,784 | 8/1989 | Mukaekubo | 310/68 B |
| 5,617,241 | 4/1997 | Kitazawa | 359/200 |
| 5,798,589 | 8/1998 | Ohi et al. | 310/90 |
| 5,895,994 | 4/1999 | Molnar et al. | 310/68 B |
| 5,932,942 | 8/1999 | Patyk et al. | 310/58 |
| 5,969,445 | 10/1999 | Horiuchi et al. | 310/64 |

FOREIGN PATENT DOCUMENTS 9-84320  3/1997  Japan .

*Primary Examiner*—Nestor Ramirez
*Assistant Examiner*—Dang Dinh Le
*Attorney, Agent, or Firm*—Beyer Weaver & Thomas, LLP

[57] ABSTRACT

A brushless motor includes motor holder having a plate, a stator attached to the plate and a rotor having a rotary shaft. The rotary shaft has a lower end that protrudes from the stator. A sensor magnet is located near the lower end of the rotary shaft. The plate has a through hole through which the sensor magnet passes. This structure allows a unit including the stator, the rotor and the sensor magnet to be preassembled. The unit is then secured to the motor holder. This permits a set of standardized parts to be attached to a non-standard part in one step, which makes assembly more efficient.

16 Claims, 4 Drawing Sheets

BRUSHLESS MOTOR AND METHOD OF MANUFACTURE

BACKGROUND OF THE INVENTION

The present invention relates to a brushless motor used in a fan of an on-vehicle air conditioner.

FIG. 3 illustrates a prior art outer-rotor type brushless motor used in a fan of an on-vehicle air conditioner. The motor includes a motor holder 1 having a generally bowl-shaped portion at its center, which has a bottom plate 1a, or a mounting plate. A stator 2 is secured to the bottom plate 1a by screws 11. The stator 2 includes a centerpiece 3, a core 4 and a wire 5 wound about the core 4. The centerpiece 3 includes a tube 3a. The tube 3a rotatably supports a rotary shaft 7 of a rotor 6. A yoke 8 of the rotor 6 is secured to the upper portion of the rotary shaft 7, which protrudes from the tube 3a. The yoke 8 surrounds the stator 2.

A sensor magnet 9 is fitted to the lower portion of the rotary shaft 7, which protrudes from the stator 2. As shown in FIG. 4C, the sensor magnet 9 includes a small diameter portion 9a and a large diameter portion 9b. As illustrated in FIG. 4B, a hole 1b is formed substantially in the center of the bottom plate 1a to receive the lower portion of the rotary shaft 7. The diameter of the hole 1b is greater than that of the small diameter portion 9a of the sensor magnet 9 and is smaller than that of the large diameter portion 9b. As shown in FIG. 4A, connectors 10, which are connected to the wire 5, protrude from the bottom of a flange 3b of the centerpiece 3. An arcuate opening 1c is joined to the hole 1b to expose the connectors 10 (see FIG. 4B) from below.

During assembly, the rotor 6 is attached to the stator 2. The stator 2 is then secured to the bottom plate 1a of the motor holder 1 by a screw 11. At this time, the lower portion of the rotary shaft 7 extends through the through hole 1b and the connectors 10 extend through the opening 1c. Thereafter, the sensor magnet 9 is fitted to the lower end of the rotary shaft 7 from the lower side of the motor holder 1. The small diameter portion 9a is inserted into the hole 1b and the large diameter portion 9b is located below the bottom plate 1a. A fastener 12 is fitted to the lower end of the rotary shaft 7, which fixes the sensor magnet 9 to the shaft 7.

A substrate 13 is fastened to the lower side of the motor holder 1 by one or more screws 14. The substrate 13 is located below the large diameter portion 9b of the sensor magnet 9. The substrate 13 has multiple elements forming an exciting circuit. The exciting circuit supplies exciting current to the wire 5 through the connectors 10. The current generates a magnetic field, which, in turn, rotates the rotor 6 and the sensor magnet 9.

The substrate 13 has a Hall element 15. The Hall element 15 is located in the vicinity of the sensor magnet 9. Rotation of the rotor 6 causes changes in the flux through the sensor magnet 9. The flux changes are detected by the Hall element 15. Accordingly, the rotational angle of the rotor 6 is detected. Exciting current is controlled based on the detected rotational angle.

A lower case 16 is fixed to the motor holder 1 and covers the lower side of the substrate 13.

The shapes of the motor holder 1 and the lower case 16 are modified to match different types of vehicles. However, the stator 2, the rotor 6 and the sensor magnet 9 are standard for all vehicles. That is, the same stator 2, rotor 6 and sensor magnet 9 are used in different types of vehicles.

When assembling the brushless motor of FIG. 3, the rotor 6 is coupled to the stator 2. The stator 2 is then fixed to the bottom plate 1a of the motor holder 1. Thereafter, the sensor magnet 9 must be fixed to the lower portion of the rotary shaft 7 from the lower side of the motor holder 1.

The sensor magnet 9, which is a standardized member, cannot be assembled to the motor until it is known which motor holder 1 will be used. That is, the sensor magnet 9 is assembled to the motor after the type of the vehicle is determined and after the motor holder 1 conforming to the selected vehicle type is manufactured. If the type of the motor holder 1 is changed, the assembly line of the motor must be greatly modified, accordingly. The standardized parts must be stored until the selected type of motor holder 1 is manufactured. This complicates the management of inventory. Further, since the motor holder 1 is added to the assemblage in an earlier step in the assembly line, the size of the assembly line must be relatively large at the upstream stages to accommodate the relatively large motor holder 1. As a result, manufacturing costs are higher.

SUMMARY OF THE INVENTION

Accordingly, it is an objective of the present invention to provide a brushless motor and a method of manufacture that have standardized assembly steps, which reduces the manufacturing costs.

To achieve the foregoing and other objectives and in accordance with the purpose of the present invention, a brushless motor is provided. The brushless motor includes a motor holder having a support member, a rotor having a rotary shaft and a sensor magnet. The rotary shaft is rotatably supported by the stator. One end of the rotary shaft protrudes from the stator. The sensor magnet is attached to the end of the rotary shaft. The support member has a through hole sized to permit the sensor magnet to pass through the support member via the through hole during assembly of the brushless motor.

Also, the present invention provides a method for assembling a brushless motor, which includes a motor holder having a support member, a stator, a rotor having a rotary shaft and a sensor magnet. The method includes: inserting a first end of the rotary shaft into the stator such that the first end of the rotary shaft protrudes from the stator; attaching the sensor magnet to the first end of the rotary shaft to form a unit, wherein the unit includes the stator, the rotor and the sensor magnet; inserting the sensor magnet into a through hole formed in the support member; and fastening the unit to the support member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
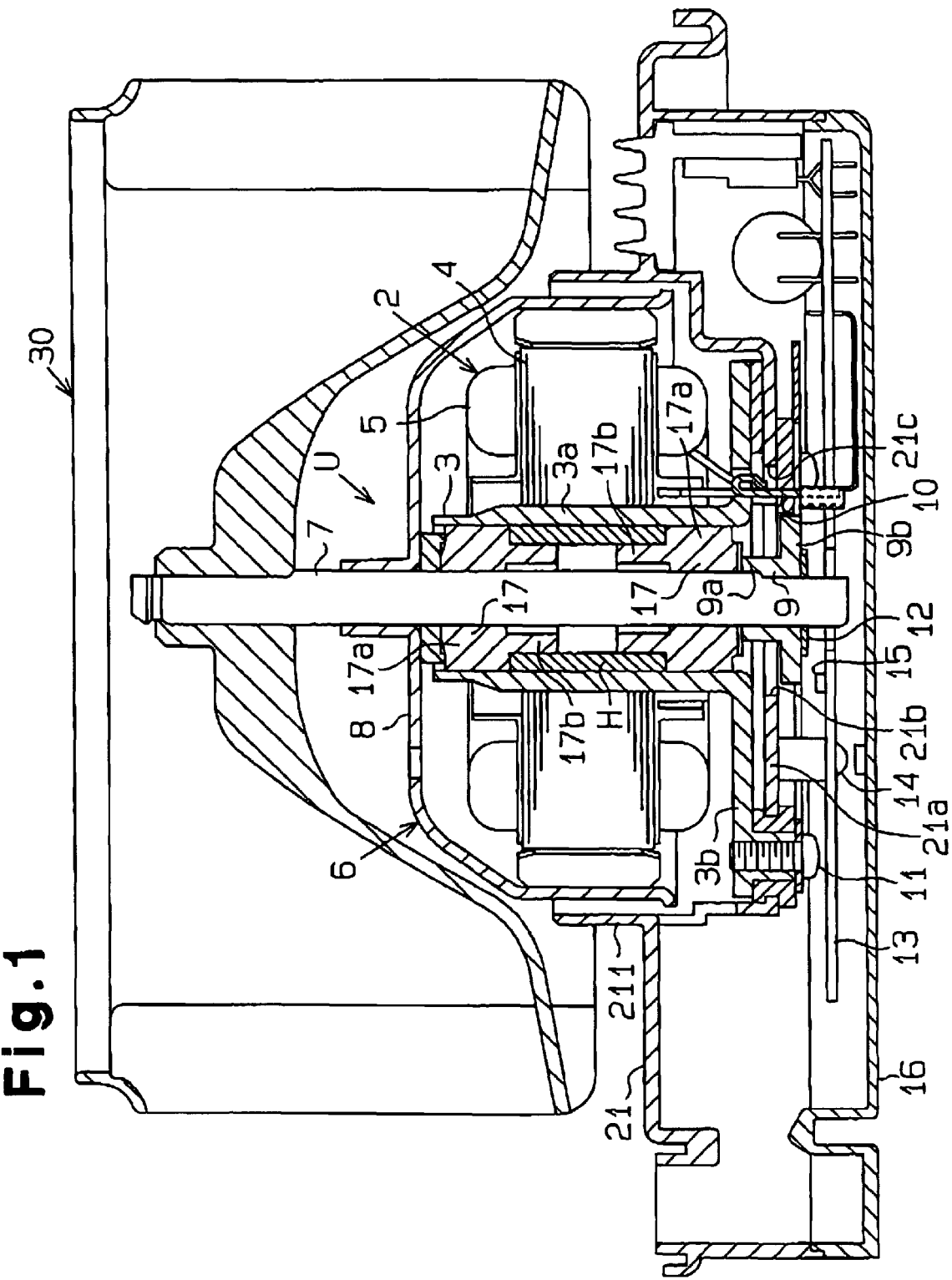
FIG. 1 is a cross-sectional view illustrating a brushless motor according to one embodiment of the present invention.

A brushless motor according to one embodiment of the present invention will now be described with reference to FIGS. 1 and 2. The same reference numerals are given to those components that are the same as the corresponding components of the prior art brushless motor of FIG. 3.

As shown in FIG. 1, the brushless motor includes a bowl 211 at its center. The bowl 211 has a bottom plate 21a, which serves as a mounting plate. A stator 2 is located in the bowl 211 and is secured to the bottom plate 21a. The stator 2 includes a centerpiece 3, a core 4 and a wire 5 wound about the core 4. The centerpiece 3 has a tube 3a and a flange 3b. The tube 3a rotatably supports the rotary shaft 7 of a rotor 6. A cylindrical holder bearing H is press fitted in the tube 3a at the axial center of the tube 3a. A pair of sliding bearings 17 are secured to the upper and lower portions of the tube 3a. Each bearing 17 has a large diameter portion 17a and a small diameter portion 17b. The outer diameter of the large diameter portion 17a is substantially equal to the inner diameter of the tube 3a, and the diameter of the small diameter portion 17b is substantially equal to the inner diameter of the holder bearing H. The inner diameter of the small diameter portion 17b is slightly larger than the inner diameter of the large diameter portion 17a. The large diameter portion 17a is press fitted in the tube 3a with its inner end contacting the holder bearing H. The small diameter portion 17b is press fitted in the holder bearing H. The rotary shaft 7 extends through and is rotatably supported by the bearings 17. The rotor 6 includes a yoke 8 fixed to the upper portion of the rotary shaft 7, which protrudes from the tube 3a. The yoke 8 covers the stator 2.

A disk-shaped sensor magnet 9 is fitted to the lower portion of the rotary shaft 7, which protrudes from the lower end of the tube 3a. The sensor magnet 9 includes a small diameter portion 9a and a large diameter portion 9b. The sensor magnet 9 is fixed to the rotary shaft 7 by a fastener 12 fitted to the shaft 7.

Figure 2A:
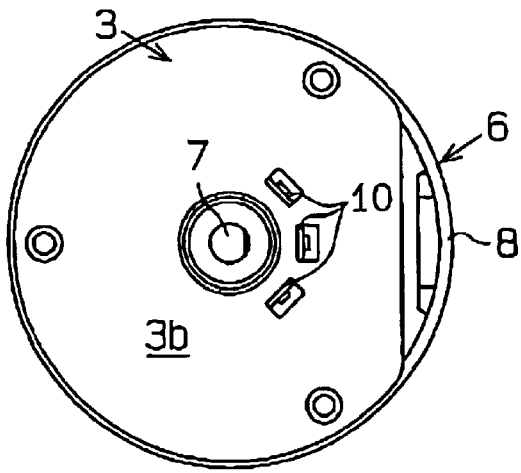
FIG. 2A is a bottom view showing a centerpiece of the brushless motor shown in FIG. 1.
Figure 2B:
FIG. 2B is a top view showing a sensor magnet of the brushless motor shown in FIG. 1.
Figure 2C:
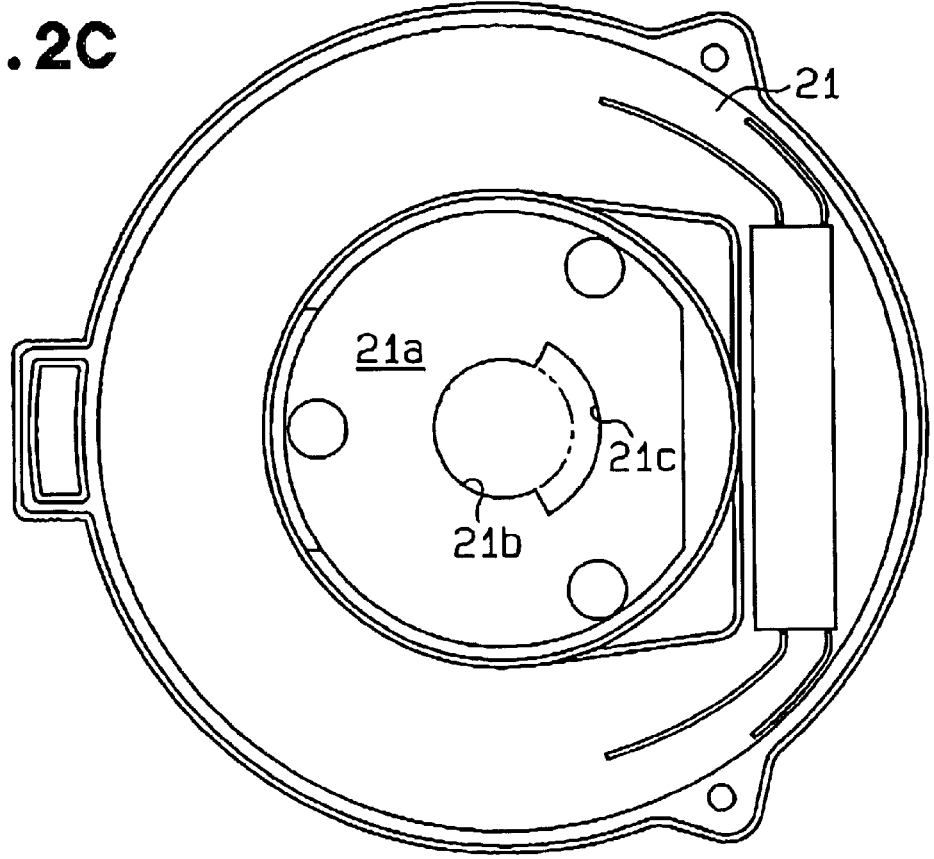
FIG. 2C is a top view showing a motor holder of the brushless motor shown in FIG. 1.

As shown in FIG. 2C, the motor holder 21 has a hole 21b formed in the bottom plate 21a. The rotary shaft 7 is inserted in the hole 21b. The diameter of the hole 21b is greater than that of the large diameter portion 9b of the sensor magnet 9 shown in FIG. 2B. As shown in FIG. 2A, connectors 10, which are connected to the wire 5, protrude from the bottom of a flange 3b of the centerpiece 3. As shown in FIG. 2C, an arcuate opening 21c is joined with the hole 21b to provide access to the connectors 10 from below.

As illustrated in FIG. 1, the flange 3b of the centerpiece 3 is fastened to the bottom plate 21a of the motor holder 21 by a screw 11. The small diameter portion 9a of the sensor magnet 9 extends through the hole 21b of the motor holder 21. The large diameter portion 9b is located below the bottom plate 21a of the motor holder 21.

The stator 2, the rotor 6, the sensor magnet 9 and the motor holder 21 are assembled in the following order. First, the bearings 17 are press fitted in the tube 3a of the centerpiece 3. Then, the rotary shaft 7 of the rotor 6 is inserted in the bearings 17 from the upper end of the tube 3a. Thus, the rotary shaft 7 is rotatably supported by the bearings 17. Thereafter, the sensor magnet 9 is fixed to the lower end of the rotary shaft 7, which protrudes from the lower side of the centerpiece 3. In this manner, a unit U, which includes the stator 2, the rotor 6 and the sensor magnet 9, is assembled.

The unit U is secured to the bottom plate 21a of the motor holder 21 as the sensor magnet 9 is inserted into the hole 21b of the motor holder 21. That is, the stator 2, the rotor 6 and the sensor magnet 9 are initially assembled to form the unit U. Then, the unit U is installed in the motor holder 21 from the top side of the motor holder 21.

A substrate 13 is fastened to the lower side of the bottom plate 21a. The substrate 13 is located below the large diameter portion 9b of the sensor magnet 9. The substrate 13 has multiple elements that form an exciting circuit. The exciting circuit supplies exciting current to the wire 5 through the connectors 10, thereby rotating the rotor 6. A Hall element 15 is located on the substrate 13 in the vicinity of the sensor magnet 9. The Hall element 15 detects the rotational angle of the sensor magnet 9, or the rotational angle of the rotor 6. The exciting circuit controls the exciting current based on the detected rotational angle.

A lower case 16 is attached to the lower side of the motor holder 21 to cover the substrate 13. A sirocco fan 30 is attached to the upper portion of the rotary shaft 7. Rotation of the rotor 6 rotates the rotary shaft 7. Accordingly, the fan 30 is rotated to move air.

The brushless motor of the illustrated embodiment has the following advantages.

(1) The hole 21b formed in the bottom plate 21a and the diameter of the hole 21b is greater than the diameter of the sensor magnet 9. The sensor magnet 9 is attached to the lower portion of the rotary shaft 7 of the rotor 6 after the stator 2 is coupled to the rotor 6. That is, the bearings 17 are first fixed in the tube 3a of the centerpiece 3. The rotary shaft 7 is inserted into the bearings 17. The sensor magnet 9 is then fixed to the lower end of the rotary shaft 7, which completes assembly of the unit U. Thereafter, the stator 2 is secured to the bottom plate 21a of the motor holder 21 as the sensor magnet 9 is inserted into the hole 21b. In this manner, the unit U is previously assembled with the standardized parts, or the stator 2, the rotor 6 and the sensor magnet 9, and then is fixed to the motor holder 21. In other words, unlike the prior art motor of FIG. 3, the sensor magnet 9 does not need to be attached to the rotary shaft 7 from the lower side of the motor holder 21 after the stator 2, with the rotor 6 attached, is fixed to the motor holder 21. Therefore, the assembly of the motor shown in FIG. 1 is easier than that of the prior art motor shown in FIG. 3. Further, in comparison to the assembly of the prior art motor shown in FIG. 3, the motor holder 21 is installed at a later step in the assembly line.

Figure 3:
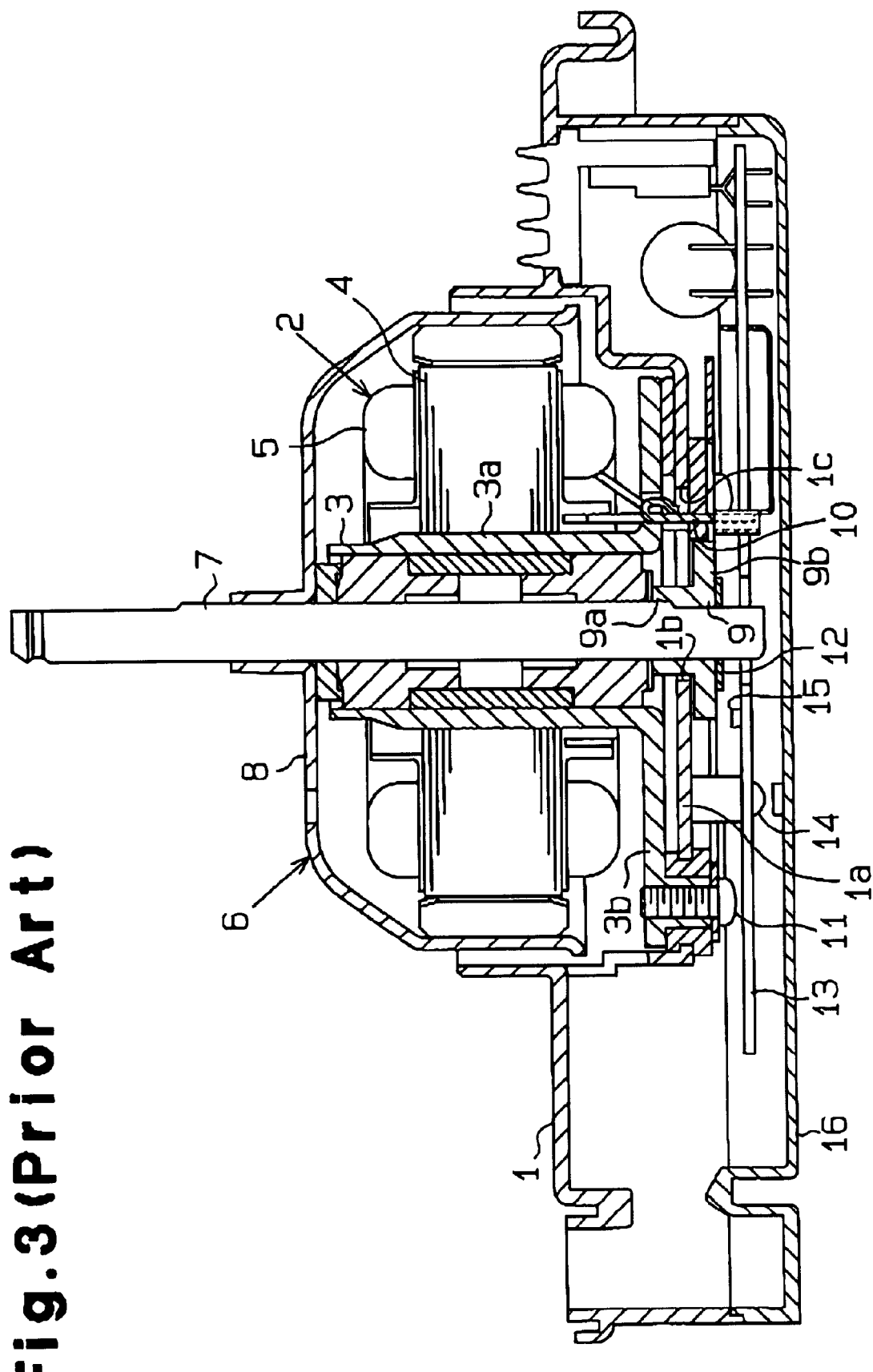
FIG. 3 is a cross-sectional view illustrating a prior art brushless motor.
Figure 4A:
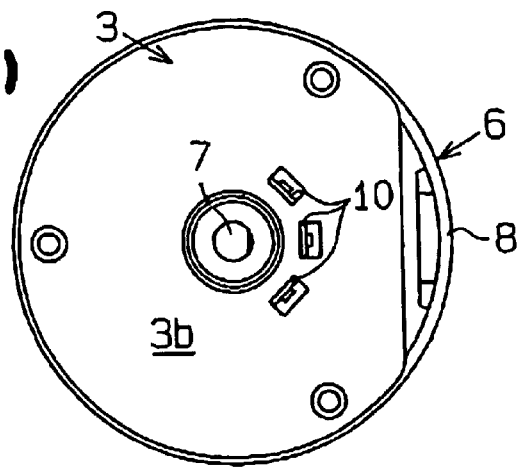
FIG. 4A is a bottom view showing a centerpiece of the brushless motor shown in FIG. 3.
Figure 4B:
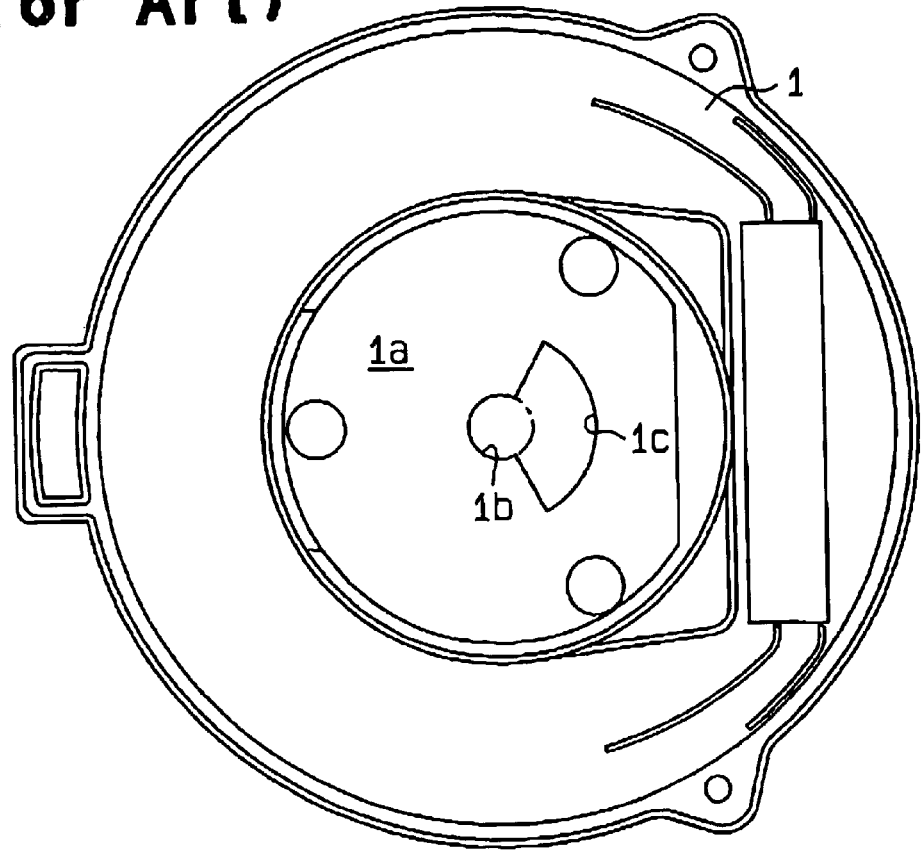
FIG. 4B is a top view showing a motor holder of the brushless motor shown in FIG. 3.
Figure 4C:
FIG. 4C is a top view of a sensor magnet of the brushless motor shown in FIG. 3.

(2) The motor of the illustrated embodiment is used to drive the fan of an on-vehicle air conditioner. Therefore, the shape of the motor holder 21 and the lower case 16 must be changed in accordance with the type of vehicle. Changing the shape of the motor holder 21 and the lower case 16 requires modification of the assembly line of the motor. In the method for manufacturing the motor according to the illustrated embodiment, the step that adds the motor holder 21, which varies depending on the type of the vehicle, is placed after the steps for assembling the unit U, which does not vary. Therefore, when changing the shape of the motor holder 21 and the lower case 16, only the later steps in the assembly line need to be changed. In comparison to the prior art of FIG. 3, the illustrated embodiment needs fewer changes in the assembly line. In other words, the assembly line for manufacturing the motor of FIG. 3 is flexibly adapted to changes in the shapes of the motor holder 21 and the lower case 16, which lowers costs.

Further, since the motor holder 21, which is relatively large among the parts of the motor, is added in a later step in the assembly line, in comparison to the prior art, the illustrated embodiment permits the size of the upstream steps of the assembly line to be reduced.

Even if the shapes of the motor holder 21 and the lower case 16 have not been determined, the stator 2, the rotor 6 and the sensor magnet 9 can be assembled as the unit U. This facilitates the inventory management of the parts constituting the unit U.

The illustrated embodiment therefore lowers manufacturing costs.

(3) The arcuate opening 21c is formed adjacent to the hole 21b so the motor holder 21 does not interfere with the connectors 10. This allows the sensor magnet 9 and the connectors 10, which protrude from the flange 3b of the centerpiece 3, to extend through the bottom plate 21a of the motor holder 21. Further, the hole 21b and the opening 21c can be simultaneously formed, which lowers manufacturing costs.

It should be apparent to those skilled in the art that the present invention may be embodied in many other specific forms without departing from the spirit or scope of the invention. Particularly, it should be understood that the invention may be embodied in the following forms.

As long as the connectors 10 are prevented from interfering with the bottom plate 21a of the motor holder 21, the shape and the location of the arcuate opening 21c may be changed. For example, the arcuate opening 21c may be replaced with a hole that is not joined with the hole 21b.

The location of the substrate 13 is not limited to that in the illustrated embodiment as long as the substrate 13 is located below the sensor magnet 9. For example, the substrate 13 may be fixed to the upper surface of the lower case 16.

Therefore, the present examples and embodiments are to be considered as illustrative and not restrictive and the invention is not to be limited to the details given herein, but may be modified within the scope and equivalence of the appended claims.

What is claimed is:

1. An outer-rotor type brushless motor comprising:
    a stator;
    a rotor surrounding the stator, the rotor having a rotary shaft that is rotatably supported by the stator, the rotary shaft having a portion that protrudes from the stator;
    a sensor magnet attached to the portion of the rotary shaft that protrudes from the stator; and
    a motor holder having a support member, the support member being configured to support the stator, the support member including a through hole sized to permit the passage of the sensor magnet, wherein the sensor magnet is passed through the support member via the through hole during assembly of the brushless motor.

2. The brushless motor according to claim 1, wherein the sensor magnet is substantially a disk-shaped and the diameter of the through hole is greater than the diameter of the sensor magnet.

3. The brushless motor according to claim 1, wherein the support member has a first surface to which the stator is secured and a second surface, which is opposite to the first surface, and wherein the one end of the rotary shaft extends through the through hole and beyond the second surface.

4. The brushless motor according to claim 3, wherein the stator, the rotor, and the sensor magnet are assembled to form a single unit.

5. The brushless motor according to claim 4, wherein the sensor magnet is substantially disk-shaped and the diameter of the through hole is greater than the diameter of the sensor magnet.

6. The brushless motor according to claim 1, wherein the support member includes a first surface, to which the stator is attached, and a second surface, which is opposite side to the first surface, wherein a substrate is arranged to face the second surface, the substrate having an electrical circuit for supplying electric current to the stator, and wherein the electrical circuit includes a magnetic sensor located in close proximity to the sensor magnet.

7. The brushless motor according to claim 6, further comprising a case attached to the motor holder to cover the electrical circuit.

8. The brushless motor according to claim 6, wherein the stator includes an electrical terminal extending toward the substrate, and wherein the support member has an opening through which the electrical terminal extends.

9. The brushless motor according to claim 8, wherein the opening is joined to the through hole.

10. The brushless motor according to claim 1, wherein the stator includes a centerpiece that supports the rotary shaft, a core located about the centerpiece and a coil wound about the core, and wherein the centerpiece is attached to the support member.

11. The brushless motor according to claim 1, wherein a fan is attached to the rotary shaft.

12. A brushless motor comprising:
    a motor holder having a mounting plate, the mounting plate having a first surface and a second surface, the second surface being opposite to the first surface, the mounting plate having a through hole;
    a stator attached to the first surface;
    a rotor having a rotary shaft, the rotary shaft being rotatably supported by the stator, one end of the rotary shaft being configured to extend through the through hole and beyond the second surface;
    a disk-shaped sensor magnet attached to the one end of the rotary shaft, the size of the through hole being greater than that of the sensor magnet in a radial direction of the rotary shaft; and
    a substrate arranged to face the second surface, the substrate having an electrical circuit for supplying electrical current to the stator, the electrical circuit including a magnetic sensor located in close proximity to the sensor magnet, the magnetic sensor being arranged to face the second surface.

13. The brushless motor according to claim 12, further comprising a case attached to the motor holder to cover the electrical circuit.

14. A brushless motor comprising:
    a motor holder having a mounting plate, wherein the mounting plate has a first surface and a second surface, the second surface being opposite to the first surface, and wherein the mounting plate has a through hole;
    a stator attached to the first surface;
    a cup-shaped rotor having a rotary shaft, the rotary shaft being rotatably supported by the stator, wherein one end of the rotary shaft extends through the through hole and beyond the second surface;

a disk-shaped sensor magnet attached to the one end of the rotary shaft, the diameter of the through hole being greater than that of the sensor magnet in a radial direction of the rotary shaft, wherein the disk-shaped sensor magnet is passed through the mounting plate via the through hole during assembly of the brushless motor;

a substrate arranged to face the second surface, the substrate being located below the sensor magnet, wherein the rotary shaft extends through the substrate, the substrate having an electrical circuit for supplying electrical current to the stator, wherein the electrical circuit includes a magnetic sensor facing the sensor magnet; and a case attached to the motor holder to cover the electrical circuit, wherein the substrate is located between the sensor magnet and the case.

15. A brushless motor comprising:

a stator, the stator having a wire, wherein the wire is wound about the core to produce a magnetic field in accordance with the level of an electric current supplied to the wire;

a rotor surrounding the stator, the rotor being fixed to a shaft that is supported by the stator, wherein a force generated by the magnetic field rotates the rotor and the shaft;

a magnet attached to the shaft;

a sensor arranged in the vicinity of the magnet, wherein the sensor is in cooperation with the magnet to detect the rotational position of the rotor;

a drive circuit for supplying electric current to the stator in accordance with the detected position; and a support member including a first surface, to which the stator is attached, and a second surface, which is opposite to the first surface, to which the drive circuit is attached, wherein the support member has a through hole, the size of the through hole being greater than that of the sensor magnet in the radial direction of the shaft, wherein the through hole permits the magnet to pass through the support member during assembly of the brushless motor, wherein the magnet is located between the support member and the drive circuit after assembly.

16. The brushless motor according to claim 15, wherein the magnet is substantially disk-shaped.

* * * * *